(12) United States Patent
Kobayashi et al.

(10) Patent No.: US 9,373,295 B2
(45) Date of Patent: Jun. 21, 2016

(54) LIQUID CRYSTAL DISPLAY DEVICE WITH TOUCH PANEL

(71) Applicant: Japan Display Inc., Tokyo (JP)

(72) Inventors: Ryota Kobayashi, Tokyo (JP); Tsutomu Furuhashi, Tokyo (JP); Hiroshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 22 days.

(21) Appl. No.: 14/314,304

(22) Filed: Jun. 25, 2014

(65) Prior Publication Data
US 2014/0375604 A1 Dec. 25, 2014

(30) Foreign Application Priority Data
Jun. 25, 2013 (JP) ................................. 2013-133224

(51) Int. Cl.
| G06F 3/044 | (2006.01) |
| G09G 3/36 | (2006.01) |
| G06F 3/041 | (2006.01) |
| G02F 1/1333 | (2006.01) |

(52) U.S. Cl.
CPC ............ *G09G 3/3648* (2013.01); *G06F 3/0412* (2013.01); *G06F 3/0418* (2013.01); *G02F 1/13338* (2013.01)

(58) Field of Classification Search
CPC ....... G06F 3/041; G06F 3/0412; G06F 3/044; G09G 3/3648; G02F 1/13338; G02F 1/134363; G02F 2001/134372; G02F 2201/12
See application file for complete search history.

(56) References Cited

U.S. PATENT DOCUMENTS

| 5,534,892 | A | * | 7/1996 | Tagawa | G06F 3/0412 178/20.01 |
| 5,923,320 | A | * | 7/1999 | Murakami | G06F 3/044 345/173 |
| 6,501,455 | B1 | * | 12/2002 | Nakamura | G09G 3/3685 345/87 |
| 6,567,062 | B1 | * | 5/2003 | Kudo | G09G 3/3648 345/89 |
| 6,670,935 | B2 | * | 12/2003 | Yeon | G09G 3/3696 345/89 |
| 7,522,131 | B2 | * | 4/2009 | Kang | G09G 3/22 345/74.1 |

(Continued)

FOREIGN PATENT DOCUMENTS

| JP | 2009-244958 A | 10/2009 |
| TW | 201222116 A1 | 6/2012 |
| TW | 201234249 A1 | 8/2012 |

OTHER PUBLICATIONS

Office Action dated Dec. 18, 2015 regarding corresponding Taiwanese Patent Application No. 103132129.

(Continued)

*Primary Examiner* — Joe H Cheng
(74) *Attorney, Agent, or Firm* — Typha IP LLC

(57) ABSTRACT

A liquid crystal display device with a touch panel includes: pixel electrodes as a plurality of electrodes to each of which a potential corresponding to a gray-scale value is applied; common electrodes as a plurality of electrodes that extend in one direction; detection electrodes as a plurality of electrodes that extend in a direction different from the one direction and detect a contact position on the panel; a liquid crystal layer that is formed of a liquid crystal composition; and a drive pulse output unit that sequentially applies a potential for detecting a touch to drive electrodes as a plurality of electrodes of a portion of the common electrodes, wherein the drive pulse output unit can output a drive pulse to the drive electrode at plural different timings within one horizontal synchronizing period for display.

10 Claims, 11 Drawing Sheets

(56) References Cited

U.S. PATENT DOCUMENTS

| | | | | |
|---|---|---|---|---|
| 8,432,347 B2* | 4/2013 | Hiraki | G09G 3/3688 | 345/102 |
| 8,902,200 B2* | 12/2014 | Miyamoto | G06F 3/0416 | 345/175 |
| 2001/0040536 A1* | 11/2001 | Tajima | G09G 3/20 | 345/55 |
| 2003/0048370 A1* | 3/2003 | Koyama | G09G 3/344 | 348/311 |
| 2004/0041778 A1* | 3/2004 | Hiraki | G09G 3/3688 | 345/100 |
| 2007/0091013 A1* | 4/2007 | Pak | G02F 1/13338 | 345/50 |
| 2010/0182273 A1 | 7/2010 | Noguchi et al. | | |
| 2010/0265212 A1* | 10/2010 | Sekiguchi | G06F 3/044 | 345/174 |
| 2011/0157064 A1 | 6/2011 | Imai | | |
| 2011/0205208 A1* | 8/2011 | Iisaka | G09G 3/3611 | 345/211 |
| 2011/0267295 A1* | 11/2011 | Noguchi | G06F 3/0416 | 345/173 |
| 2012/0262390 A1* | 10/2012 | Kida | G06F 3/041 | 345/173 |
| 2013/0293491 A1* | 11/2013 | Doi | G06F 3/044 | 345/173 |
| 2014/0015768 A1 | 1/2014 | Karpin et al. | | |
| 2014/0022188 A1 | 1/2014 | Ahn | | |
| 2014/0035862 A1 | 2/2014 | Jeong et al. | | |
| 2014/0146010 A1* | 5/2014 | Akai | G06F 3/0416 | 345/174 |
| 2015/0091865 A1* | 4/2015 | Funayama | G06F 3/044 | 345/174 |
| 2015/0192814 A1* | 7/2015 | Kosugi | G06F 3/0412 | 349/12 |
| 2015/0193057 A1* | 7/2015 | Kosugi | G06F 3/0412 | 345/174 |

OTHER PUBLICATIONS

United States Office Action dated Sep. 10, 2015 regarding related U.S. Appl. No. 14/503,438.

* cited by examiner

| HORIZONTAL SYNCHRONIZING PERIOD | 1st TIMING | 2nd TIMING | 3rd TIMING | 4th TIMING |
|---|---|---|---|---|
| 1 | T1-1 | T1-2 | T1-3 | T1-4 |
| 2 | T2-1 | T2-2 | T2-3 | T2-4 |
| ⋮ | ⋮ | ⋮ | ⋮ | ⋮ |
| n | Tn-1 | Tn-2 | Tn-3 | Tn-4 |

| HORIZONTAL SYNCHRONIZING PERIOD | DETECTION SWITCH OFF | DETECTION SWITCH ON |
|---|---|---|
| 1 | T1-OFF | T1-ON |
| 2 | T2-OFF | T2-ON |
| ⋮ | ⋮ | ⋮ |
| n | Tn-OFF | Tn-ON |

LIQUID CRYSTAL DISPLAY DEVICE WITH TOUCH PANEL

CROSS-REFERENCE TO RELATED APPLICATION

The present application claims priority from Japanese application JP2013-133224 filed on Jun. 25, 2013, the content of which is hereby incorporated by reference into this application.

BACKGROUND OF THE INVENTION

1. Field of the Invention

The present invention relates to a liquid crystal display device with a touch panel.

2. Description of the Related Art

Touch panels arranged to be overlaid on a display screen of an information communication terminal such as a computer have been widely used as input devices. Liquid crystal display devices, which are generally in widespread use as display devices, are devices that display an image by changing the orientation of a liquid crystal composition confined between two substrates, a thin film transistor substrate (hereinafter referred to as a "TFT substrate") and a color filter substrate, through a change in an electric field to thereby control the degree of transmission of light transmitting through the liquid crystal composition. In the liquid crystal display devices, the IPS (In-Plane Switching) system in which both pixel electrodes and a common electrode are arranged on the TFT substrate side realizes wide viewing-angle display by forming a so-called lateral electric field.

The touch panel is an input device that recognizes coordinates on the panel touched using a user's finger or the like and causes a processing device to perform processing. For the touch panel, a resistive film system that detects a change in the resistance value of a touched portion, an optical sensor system that detects a change in the light intensity of a portion blocked by a touch, an electrostatic capacitive coupling system that detects a change in capacitance, and the like have been known. The electrostatic capacitive coupling system has been widely used because, for example, it provides high panel transmittance and thus does not reduce display image quality and it provides high durability with no contact with other electrodes.

In recent years, due to the demand for reductions in the size and thickness of information communication terminals, a further reduction in the thickness of a liquid crystal display device with a touch panel has been required. JP 2009-244958 A discloses, in liquid crystal display devices of the IPS system, a liquid crystal display device with a touch panel whose thickness is further reduced by using the common electrode of the liquid crystal display device as the drive electrode of the touch panel.

SUMMARY OF THE INVENTION

In the touch panel in the liquid crystal display device with the touch panel, scanning of electrodes of the touch panel is performed with reference to the timing of a horizontal synchronizing signal used for display to avoid the influence of an electromagnetic wave generated in a display operation. For this reason, the drive frequency of the touch panel is the frequency of the horizontal synchronizing signal. Therefore, false detection may occur for noise or the like of an integral multiple of the horizontal synchronizing signal.

The invention has been made in view of the above circumstances, and it is an object of the invention to provide a liquid crystal display device with a touch panel in which the touch panel is driven by a drive pulse having a cycle different from that for display.

A liquid crystal display device with a touch panel according to an aspect of the invention includes: pixel electrodes as a plurality of electrodes each of which is arranged in each pixel arranged in a display area and to each of which a potential corresponding to a gray-scale value is applied; common electrodes as a plurality of electrodes that extend in one direction so as to cross the display area; detection electrodes as a plurality of electrodes that extend in a direction different from the one direction so as to cross the display area and detect a contact position on the panel; a liquid crystal layer that is formed of a liquid crystal composition whose orientation is changed by an electric field formed by the pixel electrode and the common electrode; and a drive pulse output unit that sequentially applies a potential for detecting a touch to drive electrodes as a plurality of electrodes of a portion of the common electrodes, wherein the drive pulse output unit can output a drive pulse to the drive electrode at plural different timings within one horizontal synchronizing period for display.

The liquid crystal display device with the touch panel according to the aspect of the invention may include a detection circuit that detects a touch by accumulating changes in potential at both rising and falling edges of a plurality of drive pulses applied to the common electrode.

The liquid crystal display device with the touch panel according to the aspect of the invention may further include a drive pulse storage unit that stores the timing of generating a drive pulse.

The liquid crystal display device with the touch panel according to the aspect of the invention may include a detection switch that disconnects a signal line extending from the detection electrode from the detection circuit. In this case, the liquid crystal display device with the touch panel may further include a detection switch storage unit that stores the timing of turning off the detection switch and not detecting the touch.

BRIEF DESCRIPTION OF THE DRAWINGS

FIG. 7 is a drive pulse table representing the timing of generating a drive pulse and stored in a register.

DETAILED DESCRIPTION OF THE INVENTION

Figure 1:
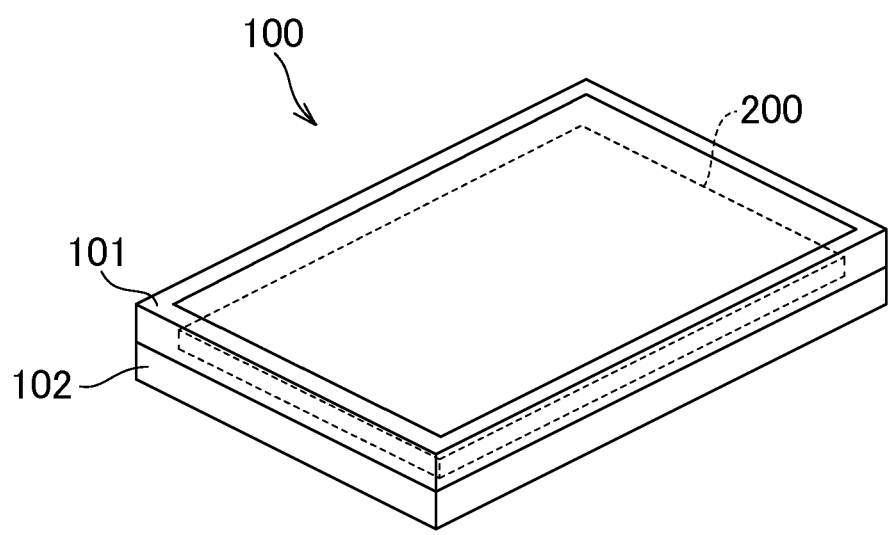
FIG. 1 is a diagram showing a liquid crystal display device with a touch panel according to an embodiment of the invention.

Hereinafter, an embodiment of the invention will be described with reference to the drawings. In the drawings, the same or equivalent elements are denoted by the same reference numerals and signs, and a redundant description is omitted.

FIG. 1 is a diagram showing a liquid crystal display device with a touch panel 100 according to the embodiment of the invention. As shown in the drawing, the liquid crystal display device with the touch panel 100 is composed of a liquid crystal display panel with the touch panel 200, and an upper frame 101 and a lower frame 102 that fix the liquid crystal display panel with the touch panel 200 so as to interpose the liquid crystal display panel with the touch panel 200 therebetween.

Figure 2:
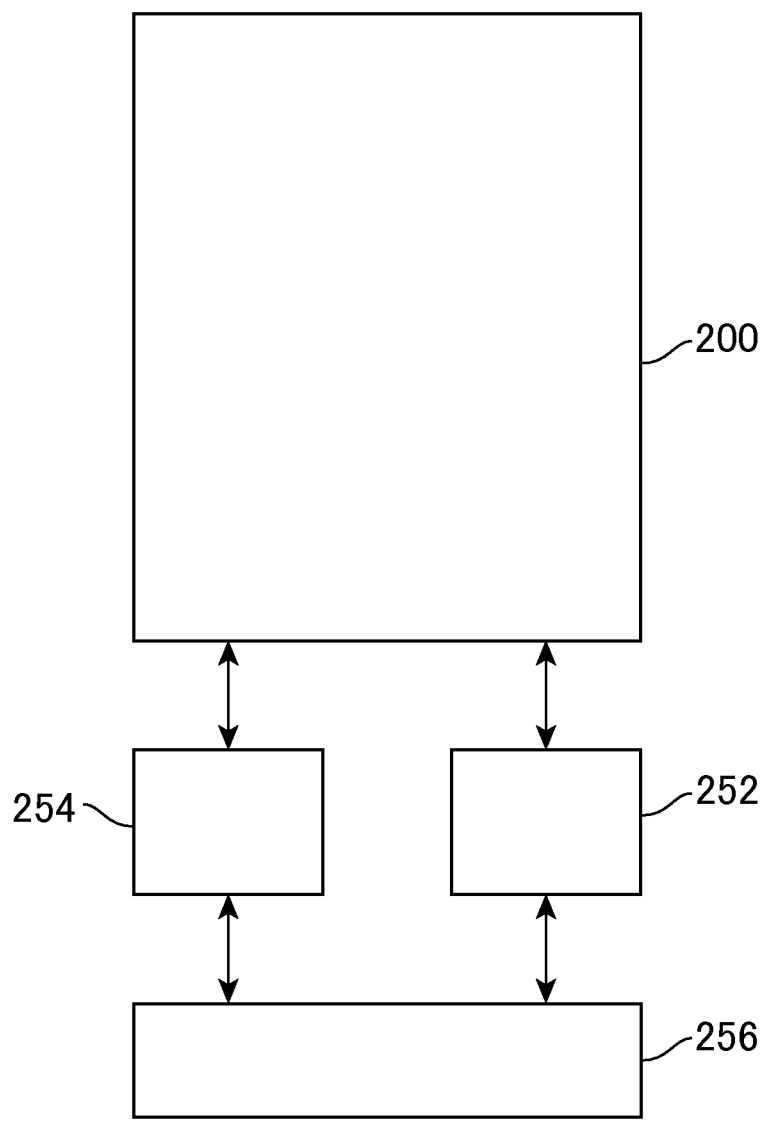
FIG. 2 is a block diagram showing the control configuration of a liquid crystal display panel with the touch panel in FIG. 1.

FIG. 2 is a block diagram showing the control configuration of the liquid crystal display panel with the touch panel 200 in FIG. 1. As shown in the drawing, the liquid crystal display panel with the touch panel 200 is controlled by a display control unit 252, a touch panel control unit 254, and a system control unit 256. The display control unit 252 controls a liquid crystal display function of performing screen display. The touch panel control unit 254 controls a touch panel function of detecting a touch position on a screen. The system control unit 256 controls the display control unit 252 and the touch panel control unit 254 in an integrated manner. The liquid crystal display device with the touch panel 100 includes the display control unit 252, the touch panel control unit 254, and the system control unit 256.

Figure 3:
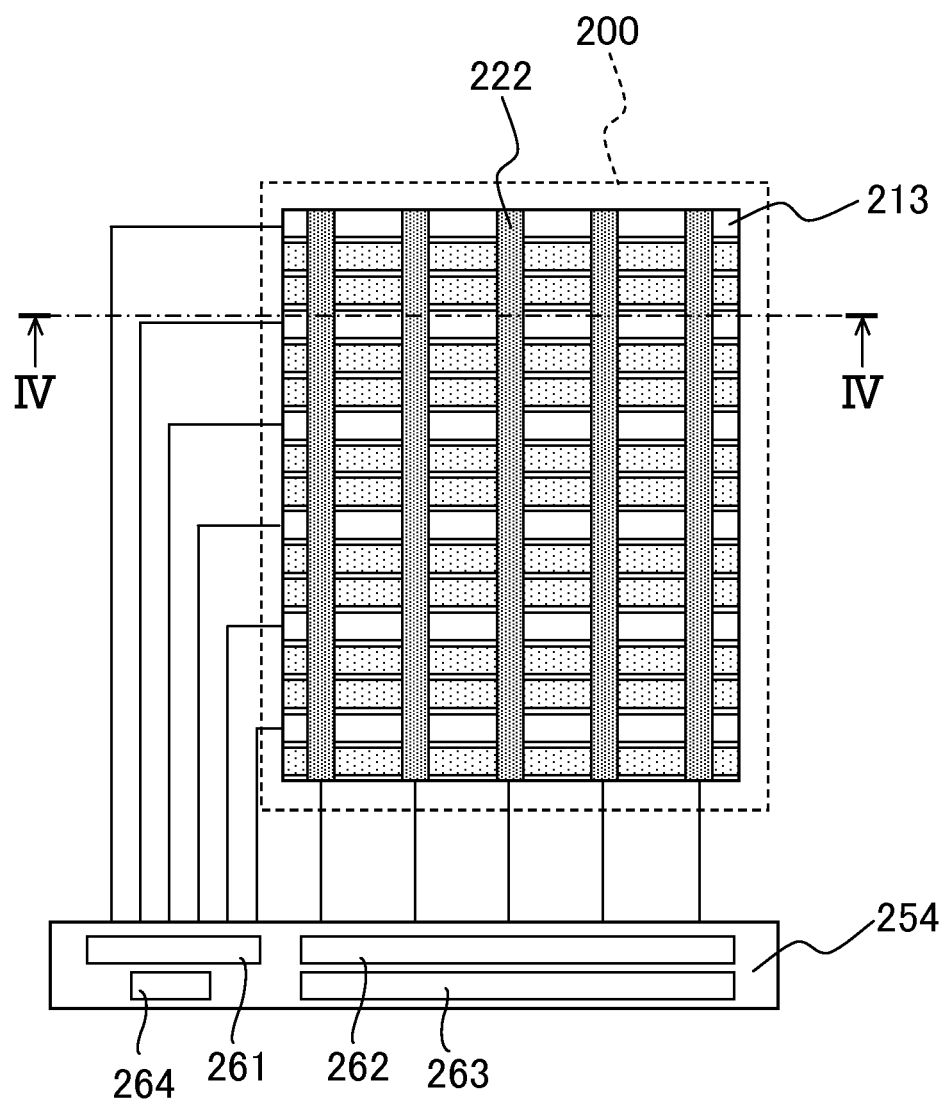
FIG. 3 is a diagram showing the arrangement of electrodes controlled by a touch panel control unit in FIG. 2.

FIG. 3 is a diagram showing an example of arrangement of electrodes controlled by the touch panel control unit 254 in FIG. 2. Common electrodes used for liquid crystal display extend in the short-side direction of a display area. A plurality of common electrodes are collectively regarded as one drive electrode 213. Each of the drive electrodes has a strip shape. The drive electrodes are arranged so as to be laid all over the display area and applied with a pulse voltage from the touch panel control unit 254. On the other hand, detection electrodes 222 have a strip shape extending in the long-side direction. A plurality of detection electrodes 222 are arranged in parallel in the short-side direction of the display area. Signals detected at the detection electrodes 222 are input to the touch panel control unit 254.

The touch panel control unit 254 includes a drive pulse output unit 261, a detection circuit 263, a detection switch 262, and a register 264. The drive pulse output unit 261 applies a drive pulse to the drive electrode 213. The detection circuit 263 accumulates the signals detected at the detection electrodes 222. The detection switch 262 controls connection and disconnection between the detection electrodes 222 and the detection circuit 263. The register 264 stores the timing of outputting the drive pulse and the timing of controlling the detection switch.

Figure 4:
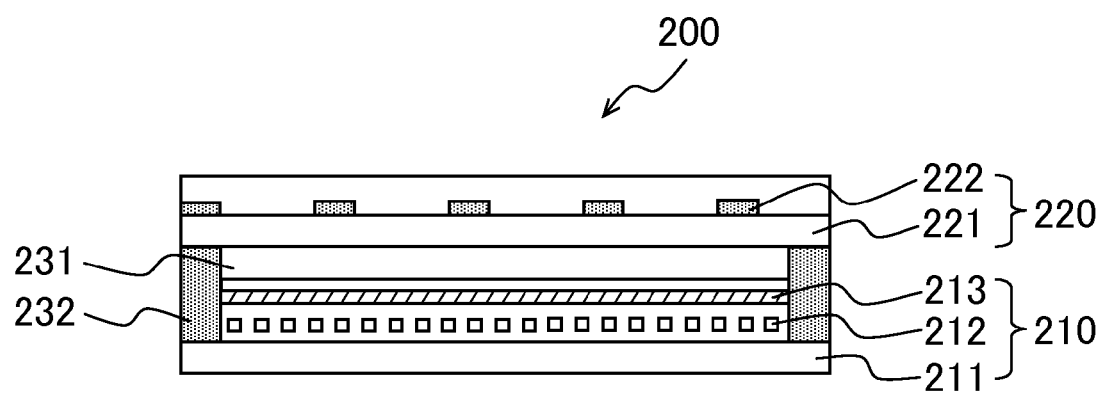
FIG. 4 is a cross-sectional view taken along the line IV-IV in FIG. 3.

FIG. 4 schematically shows a cross-sectional view taken along the line IV-IV in FIG. 3. As shown in the drawing, the liquid crystal display panel with the touch panel 200 is composed of a TFT substrate 210, a color filter substrate 220, and a liquid crystal layer 231. In the TFT substrate 210, thin film transistors (TFTs) (not shown) are formed, and circuits for controlling the orientation of liquid crystal pixel by pixel are formed. The color filter substrate 220 emits incident light through color filters (not shown) as lights at wavelengths of respective RGB colors pixel by pixel. The liquid crystal layer 231 is formed of a liquid crystal composition sealed between the substrates with a sealing material 232.

As shown in FIG. 4, pixel electrodes 212 and the drive electrode 213 that functions as a common electrode in liquid crystal display are formed on a glass substrate 211 in the TFT substrate 210, while the detection electrodes 222 are formed on a glass substrate 221 in the color filter substrate 220.

Figure 5:
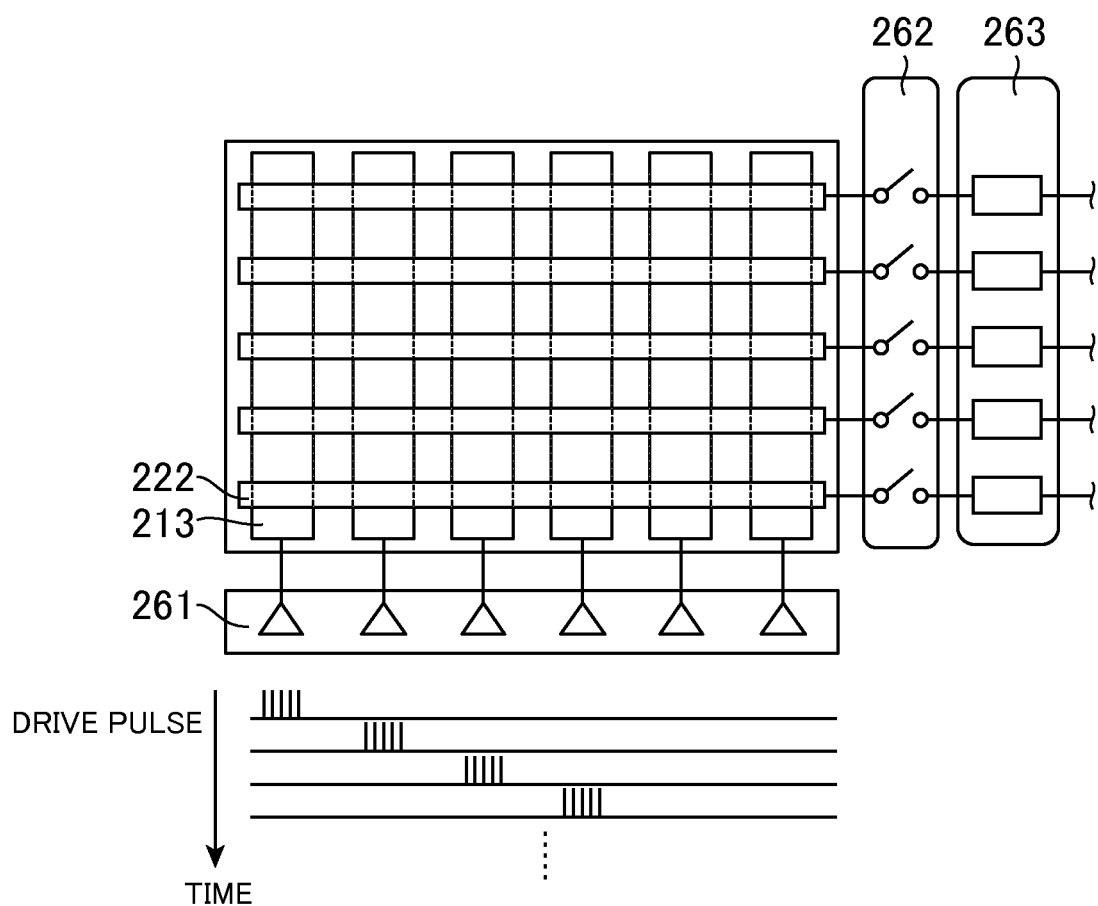
FIG. 5 is a schematic view for explaining a touch detection operation.

FIG. 5 is a schematic view for explaining a touch detection operation. As shown in the drawing, the drive pulse output unit 261 sequentially applies a plurality of drive pulses to the drive electrodes 213, and the detection circuit 263 accumulates responses detected at the detection electrodes 222 via the detection switch 262 to determine the presence or absence of a touch.

Figure 6:
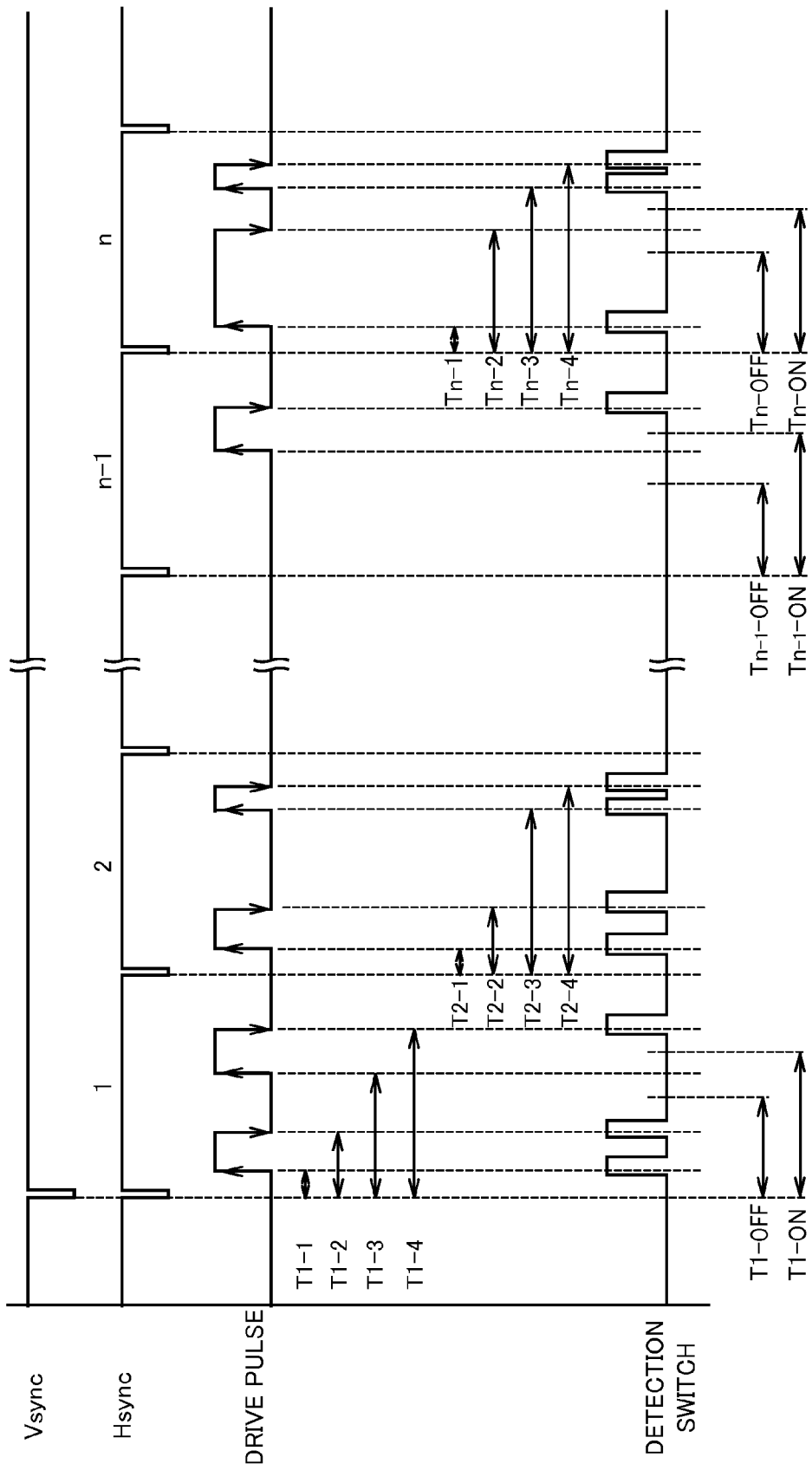
FIG. 6 is a timing diagram for explaining a drive pulse to be applied to a drive electrode.

FIG. 6 is a timing diagram for explaining a drive pulse applied to one drive electrode 213. In the timing diagram, Vsync represents a vertical synchronizing signal in liquid crystal display, while Hsync represents a horizontal synchronizing signal. As shown in the timing diagram, the drive pulse output unit 261 outputs a drive pulse based on a drive pulse table 265 (refer to FIG. 7) stored in the register 264 within the touch panel control unit 254. As shown in the timing diagram, a plurality of pulses output in one Hsync (one horizontal synchronizing period) are included. Moreover, as will be described later, changes in potential detected at the detection electrode are accumulated at both timings of rising and falling edges of the drive pulse. Further, the drive pulse rises and falls at different timings in each horizontal synchronizing period. Hence, the touch panel control unit 254 can output a drive pulse having a cycle different from that for display.

Moreover, as shown in the timing diagram, the detection switch 262 arranged between the detection electrode 222 and the detection circuit 263 selects, as an accumulating object, either pulse (rising or falling edge) output from the drive pulse output unit 261, and repeats connection and disconnection. Also for the on and off timings of the detection switch 262, the on and off of the detection switch 262 are controlled based on a detection switch table 266 (refer to FIG. 8) stored in the register 264 within the touch panel control unit 254, in addition to the drive pulse table 265 in FIG. 7.

FIG. 7 shows an example of the drive pulse table 265 representing the timing of generating a drive pulse and stored in the register 264. As described above, the drive pulse output unit 261 outputs a drive pulse based on the drive pulse table 265 stored in the register 264 within the touch panel control unit 254. In the drive pulse table 265, first and third timings mean the rising edges of a signal, while second and fourth timings mean the falling edges of the signal. In the embodiment, detection is performed twice per pulse. The drive pulse table 265 is set such that, for example, the drive pulse output unit 261 generates one or a plurality of drive pulses in one horizontal synchronizing period at a timing not affected by an electromagnetic wave in liquid crystal display.

Figure 8:
FIG. 8 is a detection switch table representing the on and off timings of a detection switch and stored in the register.

FIG. 8 shows an example of the detection switch table 266 representing the on and off timings of the detection switch 262 and stored in the register 264. Although the detection switch 262 is turned on at the timing of the rising or falling edge of a drive pulse to be output, the detection switch 262 is turned off to disconnect the detection circuit 263 and to prevent noise from entering the detection circuit 263 at, for example, an empirically-predetermined timing at which noise enters. This timing is stored in the detection switch table 266 of the register 264 separately from the drive pulse table 265. The detection switch 262 operates as shown in the timing diagram in FIG. 6 based on the drive pulse table 265 and the detection switch table 266. In the embodiment, the detection switch 262 is turned off from a period Tk-OFF (where k is an integer of 1≤k≤n) to a period Tk-ON, and turned on in other periods. This form of the detection switch table 266 has no problem even in a table of another form in which the on and off timings in each horizontal synchronizing period can be individually controlled.

Figure 9:
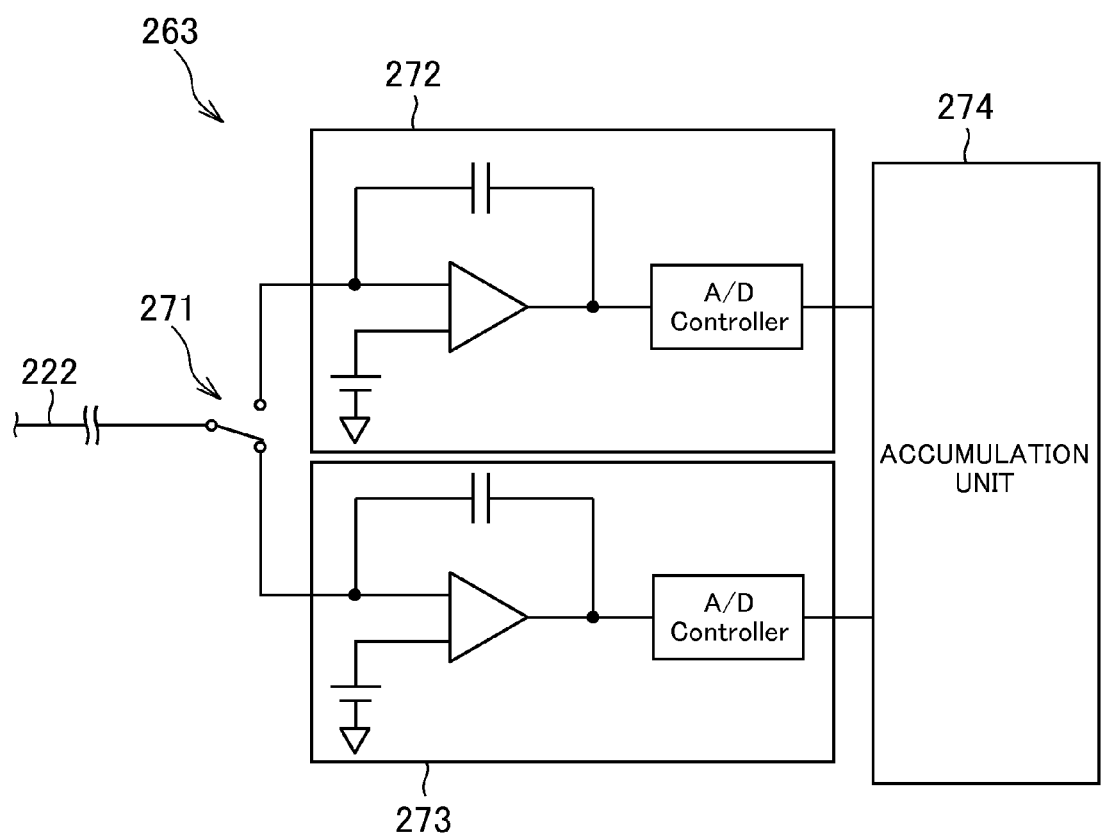
FIG. 9 is a diagram showing the internal configuration of a detection circuit.

FIG. 9 is a diagram showing the internal configuration of the detection circuit 263. The detection circuit 263 is a circuit that can accumulate signals at both the rising and falling edges of a drive pulse, and includes a switching switch 271, a rising detection circuit 272, a falling detection circuit 273, and an accumulation unit 274. The switching switch 271 is switched depending on at which edge, the rising or falling edge, the signal is accumulated. The rising detection circuit 272 converts, in the case of the rising edge, a signal into a signal capable of being accumulated. The falling detection circuit 273 converts, in the case of the falling edge, a signal into a signal capable of being accumulated. The accumulation unit 274 acquires outputs of the rising detection circuit 272 and the falling detection circuit 273, and accumulates response signals from the same detection electrode 222. At the rising detection circuit 272, the signal is accumulated negatively from a reference voltage every rising edge of a pulse of the drive electrode. At the falling detection circuit 273, the signal is accumulated positively to the reference voltage every falling edge of the pulse. The accumulation unit 274 sums the respective absolute values of differences from the reference voltage of the rising detection circuit 272 and the falling detection circuit 273. By adopting the configuration described above, since two signals can be acquired per drive pulse and accumulated, a touch can be accurately detected with fewer drive pulses.

Figure 10:
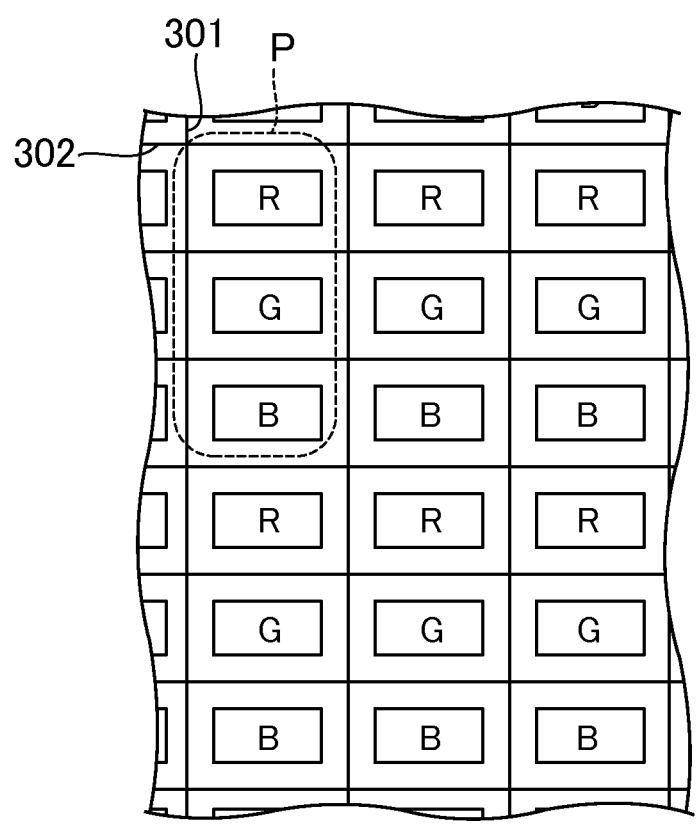
FIG. 10 is a diagram showing the pixel configuration of a liquid crystal display device with a touch panel as a modified example.

Next, a modified example of a liquid crystal display device with a touch panel according to the embodiment will be described. The overall configuration and control configuration of the liquid crystal display device with the touch panel of the modified example are the same as those of FIGS. 1 and 2, and therefore, the description thereof is omitted. FIG. 10 is a diagram showing the pixel configuration of the liquid crystal display device with the touch panel as the modified example. As shown in the drawing, pixels of the liquid crystal display device with the touch panel as the modified example have a pixel configuration such that the respective sub-pixels of R (red), G (green), and B (blue) included in one pixel P are arranged along a signal line 301, and that three scanning signal lines 302 corresponding to RGB sequentially go to a high potential to render pixel transistors conductive in one horizontal synchronizing period to thereby apply respective gray-scale voltages.

Figure 11:
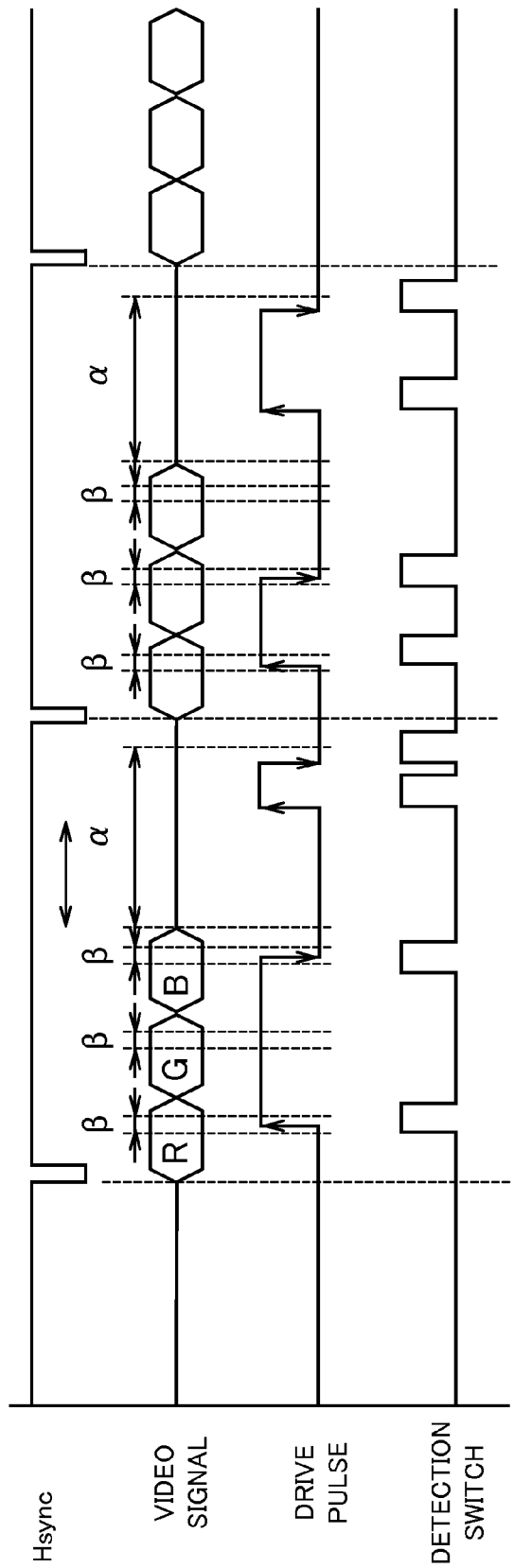
FIG. 11 is a timing diagram of application of a drive voltage in the pixel configuration in FIG. 10.

FIG. 11 is a timing diagram of application of a drive voltage in the case of the pixel configuration in FIG. 10. As shown in the timing diagram, the timing of changing a drive pulse can be set in, in addition to an interval α in which a gray-scale voltage is not applied and an electromagnetic wave is less likely to be generated from the display device, an interval β that is the timing of applying a gray-scale voltage but in which the potential of the gray-scale voltage is stable. Especially in the case of the pixel configuration as in FIG. 9 where three gray-scale voltages are applied in one horizontal synchronizing period like this modified example, it is effective to arrange the timing of a drive pulse in the interval β.

As has been described above, the touch panel can be driven by a drive signal having a cycle different from that of a horizontal synchronizing signal for display in the embodiment described above. Therefore, the influence of an electromagnetic wave generated in a display operation can be reduced, so that false detection can be prevented.

Moreover, accumulating at a timing at which detection is desired to be avoided can be avoided by turning off the detection switch. Therefore, a noise occurrence timing other than the signal having a cycle for display is also avoided, so that false detection can be further prevented.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device with a touch panel comprising:
   pixel electrodes as a plurality of electrodes each of which is arranged in each pixel arranged in a display area and to each of which a potential corresponding to a gray-scale value is applied;
   common electrodes as a plurality of electrodes that extend in one direction so as to cross the display area;
   detection electrodes as a plurality of electrodes that extend in a direction different from the one direction so as to cross the display area and detect a contact position on the touch panel;
   a liquid crystal layer that is formed of a liquid crystal composition whose orientation is changed by an electric field formed by the pixel electrode and the common electrode; and
   a drive pulse output unit that sequentially applies a potential for detecting a touch to drive electrodes as a plurality of electrodes of a portion of the common electrodes, wherein
   the drive pulse output unit can output a drive pulse to the drive electrode at plural different timings within one horizontal synchronizing period for display,
   a potential of the detection electrodes is changed by a rising and falling of the drive pulse, and
   a period from the beginning of the one horizontal synchronizing period to the rising of the drive pulse is changed for each horizontal synchronizing period.

2. The liquid crystal display device with the touch panel according to claim 1, further comprising a detection circuit that detects a touch by accumulating changes in potential at both rising and falling edges of a plurality of drive pulses applied to the common electrode.

3. The liquid crystal display device with the touch panel according to claim 1, further comprising a drive pulse storage unit that stores the timing of generating a drive pulse.

4. The liquid crystal display device with the touch panel according to claim 1, further comprising
   a detection circuit that detects the touch, and
   a detection switch that disconnects electrical connection between a signal line extending from the detection electrode and the detection circuit.

5. The liquid crystal display device with the touch panel according to claim 4, further comprising a detection switch storage unit that stores the timing of turning off the detection switch and not detecting the touch.

6. A display device with a touch panel comprising:
   a plurality of pixel electrodes;
   a common electrode that faces the pixel electrodes and extends in a first direction;
   a detection electrode that extends in a second direction intersecting the first direction; and
   a drive circuit unit that supplies a drive pulse to the common electrode,
   wherein
   the drive pulse rises at a first timing, falls at a second timing, rises at a third timing, and falls at a fourth timing in this order in one horizontal synchronizing period, the first timing, the second timing, the third timing, and the fourth timing are changeable each other, and a potential of the detection electrode is changed by a rising and falling of the drive pulse.

7. The display device with the touch panel according to claim 6, further comprising a detection circuit that detects a signal at both timings of rising and falling edges of the drive pulse.

8. The display device with the touch panel according to claim 6, further comprising a drive pulse storage unit that stores the first, second, third, and fourth timings.

9. The display device with the touch panel according to claim 6, further comprising a detection circuit that detects the touch, and a detection switch that disconnects electrical connection between a signal line extending from the detection electrode and the detection circuit.

10. The display device with the touch panel according to claim 9, further comprising a detection switch storage unit that stores the timing of turning off the detection switch.

* * * * *